United States Patent
Krutzen et al.

(10) Patent No.: US 10,184,590 B2
(45) Date of Patent: Jan. 22, 2019

(54) DEVICE AND METHOD FOR THE COATING OF A SURFACE AREA OF A GAP IN THE COATING OF A PIPELINE

(71) Applicant: BLUEMARINE OFFSHORE YARD SERVICE B.V., Rotterdam (NL)

(72) Inventors: Martijn Paulus Maria Krutzen, Delft (NL); André Luur Jan Steenhuis, Berkel en Rodenrijs (NL)

(73) Assignee: Bluemarine Offshore Yard Service, B.V., Rotterdam (NL)

( * ) Notice: Subject to any disclaimer, the term of this patent is extended or adjusted under 35 U.S.C. 154(b) by 1034 days.

(21) Appl. No.: 14/375,951

(22) PCT Filed: Jan. 31, 2013

(86) PCT No.: PCT/NL2013/050052
§ 371 (c)(1),
(2) Date: Jul. 31, 2014

(87) PCT Pub. No.: WO2013/115646
PCT Pub. Date: Aug. 8, 2013

(65) Prior Publication Data
US 2014/0370200 A1    Dec. 18, 2014

(30) Foreign Application Priority Data

Jan. 31, 2012   (NL) ..................... 2008206

(51) Int. Cl.
*F16L 1/26*     (2006.01)
*B05C 5/02*     (2006.01)
(Continued)

(52) U.S. Cl.
CPC ............ *F16L 1/26* (2013.01); *B05B 13/0436* (2013.01); *B05C 5/0241* (2013.01);
(Continued)

(58) Field of Classification Search
CPC ............. B05C 5/0241; B05B 13/0436; B05B 13/0214; F16L 1/26; F16L 58/1072; F16L 58/181; F16L 13/0272
(Continued)

(56) References Cited

U.S. PATENT DOCUMENTS

| 4,007,705 A | 2/1977 | Sherer et al. |
| 4,205,694 A * | 6/1980 | Thompson .......... B05B 13/0214 |
| | | 118/307 |
| 6,881,266 B1 * | 4/2005 | Daykin ............... B05B 13/0436 |
| | | 118/302 |

FOREIGN PATENT DOCUMENTS

| EP | 0000808 | 2/1979 |
| FR | 2723006 | 2/1996 |
| WO | 2010/130345 | 11/2010 |

OTHER PUBLICATIONS

International Search Report for PCT Application No. PCT/NL2013/050052, dated Apr. 24, 2013.
(Continued)

*Primary Examiner* — Laura Edwards
(74) *Attorney, Agent, or Firm* — Meyertons, Hood, Kivlin, Kowert & Goetzel, P.C.

(57) ABSTRACT

The present invention is for coating a surface area of a gap in the coating of a pipeline, said surface area having a length along the central longitudinal axis of the pipeline and a width of at least part of the circumference of the pipeline. The device according to the invention comprises: a frame; a spray nozzle support element supporting a number of spray nozzles; a linear motion mechanism configured for translating the spray nozzle support element relative to the frame and parallel to a longitudinal axis of the frame; and support members configured for arranging the frame stationary
(Continued)

relative to the pipeline with said longitudinal axis of said frame coinciding with the central longitudinal axis of the pipeline.

14 Claims, 6 Drawing Sheets

(51) Int. Cl.
*B05B 13/04* (2006.01)
*F16L 58/18* (2006.01)
*F16L 13/02* (2006.01)
*F16L 58/10* (2006.01)

(52) U.S. Cl.
CPC ....... *F16L 13/0272* (2013.01); *F16L 58/1072* (2013.01); *F16L 58/181* (2013.01); *Y10S 118/11* (2013.01); *Y10S 118/13* (2013.01)

(58) Field of Classification Search
USPC .................. 118/323, 305, DIG. 11, DIG. 13
See application file for complete search history.

(56) References Cited

OTHER PUBLICATIONS

Written Opinion for PCT Application No. PCT/NL2013/050052, dated Apr. 24, 2013.
International Preliminary Report on Patentability for PCT Application No. PCT/NL2013/050052, dated Apr. 24, 2013.

\* cited by examiner

DEVICE AND METHOD FOR THE COATING OF A SURFACE AREA OF A GAP IN THE COATING OF A PIPELINE

The present invention is related to the coating of a surface area of a gap in the coating of a pipeline, said surface area having a length along the central longitudinal axis of the pipeline and a width of at least part of the circumference of the pipeline.

The coating of a surface area of a gap in the coating of a pipeline is known in the field of laying steel pipelines offshore on the seabed for oil and gas applications.

The outside surface of the steel wall of such pipelines is in many cases coated with a coating, for instance an anti-corrosion coating, which protects the outer surface of the steel wall from outside corrosive influences.

Such offshore pipelines are in general formed by butt-welding the ends of lengths of pipe coated with the anti-corrosion coating to one another on a pipe laying vessel, and subsequently lowering the thus formed pipeline towards the seabed. In order to be able to butt-weld the lengths of pipe to one another, the steel wall of each length of pipe is at each end thereof uncoated along a certain part of the length of pipe. This uncoated part of the lengths of pipe is referred to as a cut-back. After the ends of two lengths of pipe are placed against each other the respective ends are girth-welded. The uncoated parts of the lengths of pipe that are welded together form a gap in the anti-corrosion coating of the resulting pipeline. In order to provide a pipeline that has an anti-corrosion coating along the length thereof, the surface area of the gap is subsequently coated with an anti-corrosion coating forming material.

It is known to apply the coating on a surface area of the gap by means of a powder coating process, wherein first the surface area to be coated is heated, for instance by induction heating, and subsequently coating forming material in powder form is spayed on the heated surface area. Heat transferred from the heated surface area to the coating forming material in powder form applied thereon cures the material in powder form such that a permanent coating results.

The goal of the present invention is to provide a device for coating a surface area of a gap in the coating of a pipeline.

The device according to the invention comprises:
a frame;
a spray nozzle support element supporting a number of spray nozzles;
a linear motion mechanism configured for translating the spray nozzle support element relative to the frame and parallel to a longitudinal axis of the frame; and
support members configured for arranging the frame stationary relative to the pipeline with said longitudinal axis of said frame coinciding with the central longitudinal axis of the pipeline;
such that by translating the spray nozzle support element relative to the frame by means of said linear motion mechanism, the spray nozzles are displaceable along the length of said surface area with said spray nozzles directed at said surface area.

The device according to the inventions makes it possible to apply coating material to the surface area to be coated in a controlled and accurate way, wherein the distance over which the spray nozzle support element is translated along the central longitudinal axis of the pipeline is adjustable to the length of the surface area to be coated in a simple way.

In an advantageous embodiment of the device according to the invention the device further comprises:

a rotary motion mechanism configured for rotating the spray nozzle support element relative to the frame about said longitudinal axis of the frame;
such that by rotating the spray nozzle support element relative to the frame about said longitudinal axis of the frame the spray nozzles are displaceable along the width of said surface area.

These features make it possible to displace the spray nozzle support element along the width of the surface area to be coated in an accurate and controlled way. In particular this makes it possible to first translate the spray nozzle support element in one direction along the length of the surface area to be coated, then displace the spray nozzle support element along the width of the surface area to be coated, and subsequently translate the spray nozzle support element in the opposite direction along the length of the surface area to be coated such that the coating material applied on the surface area during the second translation of the spray nozzle support element along the length of the surface area partly overlaps the coating material applied in the surface area during the second translation of the spray nozzle support element along the length of the surface area. This has the advantage that the uneven distribution of the applied coating in the direction of the width of the surface area to be coated as a result of the spray cone generated by the spray nozzles can be compensated, resulting in a more uniform coating. Thereto, the device according to the invention is preferably configured such that the linear motion mechanism and the rotary motion mechanism are arranged in series and have separate drives. The latter makes it possible to translate the nozzle support element without rotating the nozzle support element, and vice versa, for example. Preferably, one of the linear motion mechanism and the rotary motion mechanism is arranged between a support frame and the nozzle support element for moving the nozzle support element relative to the support frame, while the other one of the linear motion mechanism and the rotary motion mechanism is arranged between the frame and the support frame for moving the support frame and the nozzle support element arranged thereon relative to the frame. With the linear motion mechanism and the rotary motion mechanism arranged in series and having separate drives it is further preferred that the device further includes at least one controller connected to the drives for controlling the linear motion mechanism and the rotary motion mechanism.

It would however be possible to have a device according to the invention without the feature of a rotary motion mechanism.

In an advantageous embodiment of the device according to the invention the spray nozzle support element extends along at least part of a circle about said longitudinal axis of the frame, and a plurality of spray nozzle is distributed along said at least part of a circle, preferably equidistantly distributed along said at least part of a circle.

These features make it possible to increase the part of the surface area to be coated along the width thereof to which coating material is applied during the translation of the spray nozzle support element in one direction relative to the frame along the length of the surface area to be coated.

In a preferred embodiment thereof the spray nozzle support element extends along a full circle about said longitudinal axis of the frame. This embodiment is in particular advantageous in case the surface area to be coated extends along the full circumference of the pipeline. Alternatively the spray nozzle support element extends along a part of a circle about said longitudinal axis of the frame.

In a preferred embodiment thereof the spray nozzles are cone spray nozzles and are arranged such that in use adjacent spray cones partly overlap. With the plurality of spray nozzle distributed along said full circle and the spray cones overlapping, the full surface area to be coated, which extends along the full circumference of the pipeline, can be coated with one translation of the nozzle support element along the length of the surface area of the gap along the central longitudinal axis of the pipeline.

In particular in combination with the preferred feature of a rotary motion mechanism in addition to the linear motion mechanism, the feature of the spray nozzle support element extending along a full circle about said longitudinal axis of the frame having distributed thereon a plurality of spray nozzles, wherein preferably the spray nozzles are cone spray nozzles that are arranged such that adjacent spray cones partly overlap, allows for a particularly fast way of applying a particularly uniform coating. The latter will be further explained in the description with reference to the accompanying schematic figures.

According to an advantageous development of the preferred embodiment in which the spray nozzle support element extends along a full circle about said longitudinal axis of the frame, said spray nozzle support element comprises a plurality of sub elements each extending along a part of said circle about said longitudinal axis of the frame, which sub elements are interconnected via hinges such that said sub elements are rotatable relative to each other to be able to arrange said spray nozzle support element around the circumference of said pipeline. These features provide a simple way of arranging the spray nozzle support element around the circumference of a pipeline. According to a further advantageous development the device further comprises a number of actuators for rotating said sub elements relative to each other. These features provide for assisted rotation of the sub elements relative to each other.

According to a further advantageous development of the device according to the invention the spray nozzle support element comprises a spray chamber defined by a number of walls, which spray chamber is open towards said longitudinal axis of the frame and in which spray chamber said spray nozzles are arranged, wherein said spray chamber is configured to extend from said spray nozzles towards said longitudinal axis of the frame such that together with the surface area to be coated said spray chamber encloses a spray space.

These features prevent coating material that is forced through the spray nozzles towards the surface area to be coated to end up in the surroundings of the device where it may contaminate equipment and may be harmful for operating personnel.

According to an advantageous development of the device according to the invention comprising a spray chamber, the spray nozzle support element further comprises a seal member arranged at an end of the spray chamber away from the spray nozzles and configured to close a gap between the spray chamber and the surface area to be coated.

This feature improves the prevention of coating material ending up in the surroundings of the device.

According to an advantageous development of the device according to the invention comprising a spray chamber, the device further comprises a number of suction elements arranged in said spray chamber and connectable to a suction apparatus.

This feature allow for a controlled removal from within the spray chamber of coating material that is forced through the spray nozzles towards the surface area to be coated but that does not adhere to the surface area, such that it is further prevented that coating material ending up in the surroundings of the device.

According to a further advantageous development of the device according to the invention comprising a number of suction elements arranged in said spray chamber and connectable to a suction apparatus, said spray nozzle support element comprises a number of separation walls arranged in the spray chamber between the suction elements and the spray nozzles, and configured for partly separating said suction elements from said spray nozzles.

These features make it possible to prevent coating material to be sucked out of the spray chamber before being brought into contact with the surface area to be coated.

According to a further advantageous development of the device according to the invention comprising a number of suction elements arranged in said spray chamber and connectable to a suction apparatus, said suction elements are arranged on opposite sides of said spray nozzles.

This feature makes it possible to improve the removal from the spray chamber of coating material that does not adhere to the surface area to be coated.

According to an advantageous further development of the device according to the invention, the device comprises an output adjustment mechanism configured for adjusting the output rate of a coating material sprayed by each of said spray nozzles.

This feature makes it possible to compensate for the variation in the influence of the gravitational force on the coating forming material as a result of different positions of the spray nozzles. Preferably, each of the spray nozzles comprises an adjustment mechanism which is configured for adjusting the output rate thereof.

The compensation for the variation in the influence of the gravitational force on the coating forming material as a result of different positions of the spray nozzles is in particular advantageous in a situation wherein the central longitudinal axis of the coated pipeline with the gap to be coated is in a horizontal position, such as with the so-called S-lay method of pipe laying. In this S-lay method each length of pipe to be connected to the main pipeline is welded thereto and moved in a horizontal position to a stinger which guides the pipeline into the water, with a double bend giving the pipeline which is being laid the form of an “S”. The coating forming material sprayed against a part surface area at the underside of the pipeline via a nozzle is sprayed in a direction opposite to the working direction of the gravitational force, while the coating forming material sprayed against a part surface area at the upper side of the pipeline via a nozzle is sprayed in the same direction as the working direction of the gravitational force. Without the above described compensation for the variation in the influence of the gravitational force on the coating forming material, the amount of coating forming material that adheres to the surface area at the underside is less than the amount of coating forming material that adheres to the surface area at the upper side, resulting in a less uniform coating.

In particular the above described preferred embodiment of the device according to the invention including the feature of a rotary motion mechanism in addition to the linear motion mechanism, in combination with the feature of the spray nozzle support element extending along a full circle about said longitudinal axis of the frame having distributed thereon a plurality of spray nozzles, wherein preferably the spray nozzles are cone spray nozzles that are arranged such that adjacent spray cones partly overlap, allows for an advantageous implementation of compensation for the variation in the influence of the gravitational force on the coating forming material as a result of different positions of the spray nozzles. As will be explained herein below with respect to the figures, this embodiment allows for a particular fast way of applying a particularly uniform coating with only a relatively small rotation of the spray nozzle support element, preferably a rotation of half the distance between adjacent spray nozzles. As a result of this relatively small rotation the resulting change of position of the spray nozzles along the circumference of the pipeline can be so small that the change of influence of the gravitational force on the coating forming material as a result of the rotation is small. This makes it possible to choose one output rate for each spray nozzle and to keep the same output rate throughout the linear and rotational motion of the spray nozzles. The advantage then is that the compensation mechanism can be simple. For instance a simple mechanical spray nozzle output adjustor on each spray nozzle, or even spray nozzle each having a fixed output rate chosen on the basis of the position of each spray nozzle in the spray nozzle support element.

According to an advantageous further development of the device according to the invention, said support members include adjusting members configured for adjusting the position of said longitudinal axis of said frame relative to the central longitudinal axis of said pipeline.

This feature provides the possibility to effectively and accurately align the position of said longitudinal axis of said frame and the central longitudinal axis of said pipeline.

According to an advantageous further development of the device according to the invention, said support members are arranged to support said frame on a coated surface area of said pipeline.

This feature provides a simple and effective way to arrange the frame stationary relative to the pipeline with said longitudinal axis of said frame coinciding with the central longitudinal axis of the pipeline.

According to an advantageous further development of the device according to the invention, said support members include clamping members configured for clamping the frame on the pipeline such that the frame is stationary relative to the pipeline.

This feature helps to keep the frame of the device stationary relative to the pipeline during the use of the device.

According to an advantageous further development of the device according to the invention the frame comprises two parallel U-shaped frame elements extending perpendicular to said longitudinal axis of the frame and spaced apart along said longitudinal axis of the frame, wherein said support members are arranged on said U-shaped frame elements, and wherein said linear motion mechanism is arranged such that said spray nozzle support element is translatable in between said U-shaped frame elements.

These features provide a simple and effective design of the frame.

The present invention further relates to a method for coating a surface area of a coated pipeline, said surface area having a length along the central longitudinal axis of the pipeline and a width of at least part of the circumference of the pipeline.

The method according to the invention comprises the steps of:
(a) arranging stationary relative to the pipeline, a frame having displaceable attached thereto a spray nozzle support element having arranged thereon a number of spray nozzles;
(b) forcing a coating forming material through said spray nozzles while displacing said spray nozzle support element relative to the frame such that
    said spray nozzles are translated in a first direction parallel to said longitudinal axis of said pipeline along the length of said surface area, and
    said coating forming material is applied on said surface area.

In a preferred embodiment thereof, the method further comprises after step (b), the steps of
(c) displacing said spray nozzle support element relative to the frame such that said spray nozzles are rotated about said longitudinal axis of said pipeline; and subsequently
(d) forcing said coating forming material through said spray nozzles while displacing said spray nozzle support element relative to the frame, such that
    said spray nozzles are translated in the direction opposite to the first direction along the length of said surface area; and
    said coating forming material is applied on said surface area;
wherein
    steps (c) and (d) are executed such that the coating material applied by a spray nozzle on the surface area in step (d) partly overlaps the coating material applied by said spray nozzle on the surface area in step (b).

According to a further preferred embodiment of the method according to the invention the method comprises during step b, the step of displacing said spray nozzle support element relative to the frame such that said spray nozzles are rotated back and forth about said longitudinal axis of said pipeline in an oscillating motion while said spray nozzles are translated in said first direction parallel to said longitudinal axis of said pipeline.

In a preferred embodiment of the method according to the invention the spray nozzle support element extends along at least part of a circle about said longitudinal axis of the pipeline, a plurality of spray nozzles is equidistantly distributed along said at least part of a circle, and the displacement of said spray nozzle support element relative to the frame such that said spray nozzles are rotated about said longitudinal axis of said pipeline is half the distance between adjacent spray nozzles along said at least part of a circle. In particular in the embodiment wherein said spray nozzles are rotated back and forth about said longitudinal axis of said pipeline in an oscillating motion, in specific cases, displacement of said spray nozzle support element relative to the frame such that said spray nozzles are rotated about said longitudinal axis of said pipeline over another distance could be beneficial in order to achieve a more uniform coating relative to a situation wherein the spray nozzle support element is only translated parallel to said longitudinal axis of said pipeline.

According to an advantageous development of the method according to the invention, the method further comprises the step of adjusting the output rate of each of said spray nozzles such that the variation in the influence of the gravitational force on the coating forming material as a result of different positions of the spray nozzles is compensated for.

Preferably the above described controllers of the device according to the invention are configured for performing the method according to the invention.

The present invention is further elucidated in the following description with reference to the accompanying schematic figures. In the figures non limitative embodiments of the device and method according to the invention are shown.

Figure 1:
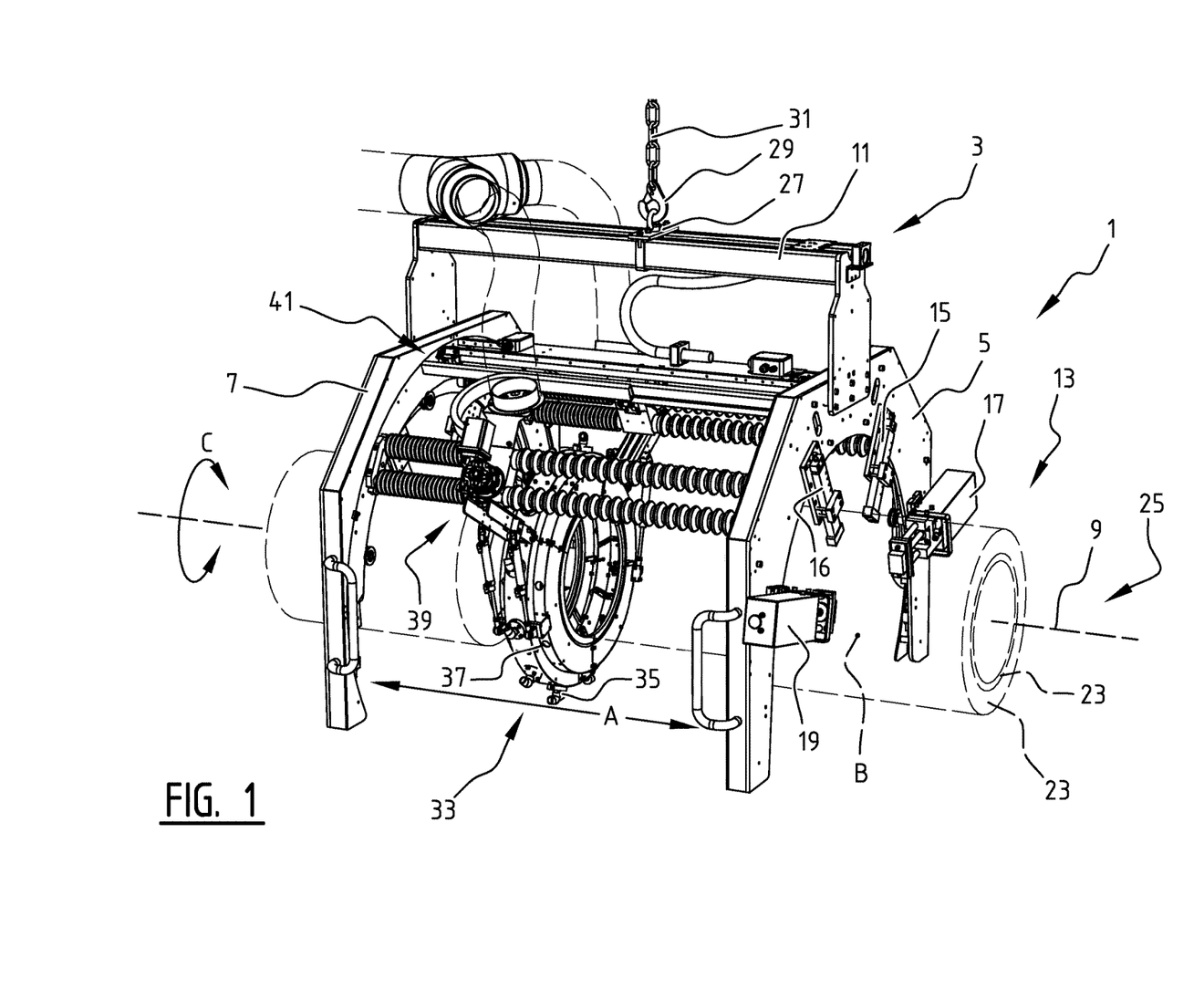
FIG. 1 shows a perspective view of an embodiment of the device according to the invention arranged on a schematically shown pipeline.

FIG. 1 shows an embodiment of a device 1 according to the invention.

The device 1 as shown in FIG. 1 has a frame 3 having two parallel U-shaped frame elements 5, 7 that extend perpendicular to a longitudinal axis 9 of the frame 3. The U-shaped frame elements 5, 7 are spaced apart along the longitudinal axis 9 of the frame 3 in the direction of arrows A and are connected by means of a connecting beam 11.

As shown in FIG. 1 the frame 3 is arranged on a pipeline 13 by means of support members that are mounted on each of the U-shaped frame elements 5, 7. The support members include adjusting members 15, 16 and clamping members 17, 19. The adjusting members are mounted at one end thereof on the U-shaped frame elements 5, 7 and extend in the direction of the longitudinal axis 9 of the frame 3. As shown in FIG. 1 the end of the adjusting members away from the U-shaped frame elements 5, 7 are in contact with the outer surface B of an insulating mantle 21 that surrounds the wall 23 of the pipeline 13. The clamping members 17, 19 are at one end thereof mounted on the U-shaped frame elements 5, 7 and are extendable in the direction of the longitudinal axis 9 of the frame 3. The end of the clamping members 17, 19 away from the frame 3 are, as shown in FIG. 1, in contact with the outer surface of the insulating mantle 21.

As shown in FIG. 1 the adjusting members 15, 16 and clamping members 17, 19 are extended such that the frame 3 is arranged on the pipeline 13 with the longitudinal axis 9 of the frame 3 coinciding with the central longitudinal axis 25 of the pipeline 13. The clamping members 17, 19 exert in clamping force on the surface B of the insulation mantle 21 such that the frame 3 is arranged stationary relative to the pipeline 13.

Although not shown in FIG. 1 adjusting members 15, 16 and clamping members 17 and 19 are mounted on each of the U-shaped frame elements.

As shown in FIG. 1 the frame 3 is arrangeable on the pipeline 13 and is liftable away therefrom by means of a hoisting eye 27 that is mounted on the connecting beam 11. For exemplary purposes it is shown in FIG. 1 that a hook 29 at the end of a chain 39 of a hoisting installation (not shown) is coupled with the hoisting eye 27.

As shown in FIG. 1 the device 1 is further provided with a spray nozzle support element 33 that supports a number of spray nozzles 35. The spray nozzle support element 33 as shown in FIG. 1 is ring-shaped and surrounds a section 13b of the pipeline that has no insulation mantle surrounding the wall 23 of the pipeline 13. The spray nozzle support element 33 extends along a full circle around the longitudinal axis 9 of the frame 3. Details of the spray nozzle support elements 33 will be described further herein below with reference to FIGS. 3 and 4.

The device 1 of FIG. 1 is further provided with a linear motion mechanism 39 by means of which the spray nozzle support element 33 is translatable relative to the frame 3 parallel to the longitudinal axis 9 of the frame 3 in the direction of arrows A. Furthermore the device 1 is provided with a rotary motion mechanism 41 by means of which the spray nozzle support element 33 is rotatable relative to the frame 3 about the longitudinal axis 9 of the frame 3 in the direction of arrows C.

Since, as shown in FIG. 1, the frame 3 is arranged on the pipeline 13 with the longitudinal axis 9 thereof coinciding with the central longitudinal axis 25 of the pipeline 13 and is arranged stationary relative to the pipeline 13, the spray nozzle support element 33 and spray nozzles 35 are translatable by means of the linear motion mechanism 39 along the central longitudinal axis 25 of the pipeline 13 in the direction of arrows A. Furthermore since the frame 3 is arranged on the pipeline 13 with the longitudinal axis 9 thereof coinciding with the central longitudinal axis 25 of the pipeline and since the frame 3 is arranged stationary relative to the pipeline 13, the spray nozzle support element 33 and spray nozzles 35 are rotatable about the central longitudinal axis 25 of the pipeline 13 in the direction of arrows C by means of the rotary motion mechanism 41. Details of the linear motion mechanism 39 and of the rotary motion mechanism 41 are shown in FIG. 2.

Figure 2:
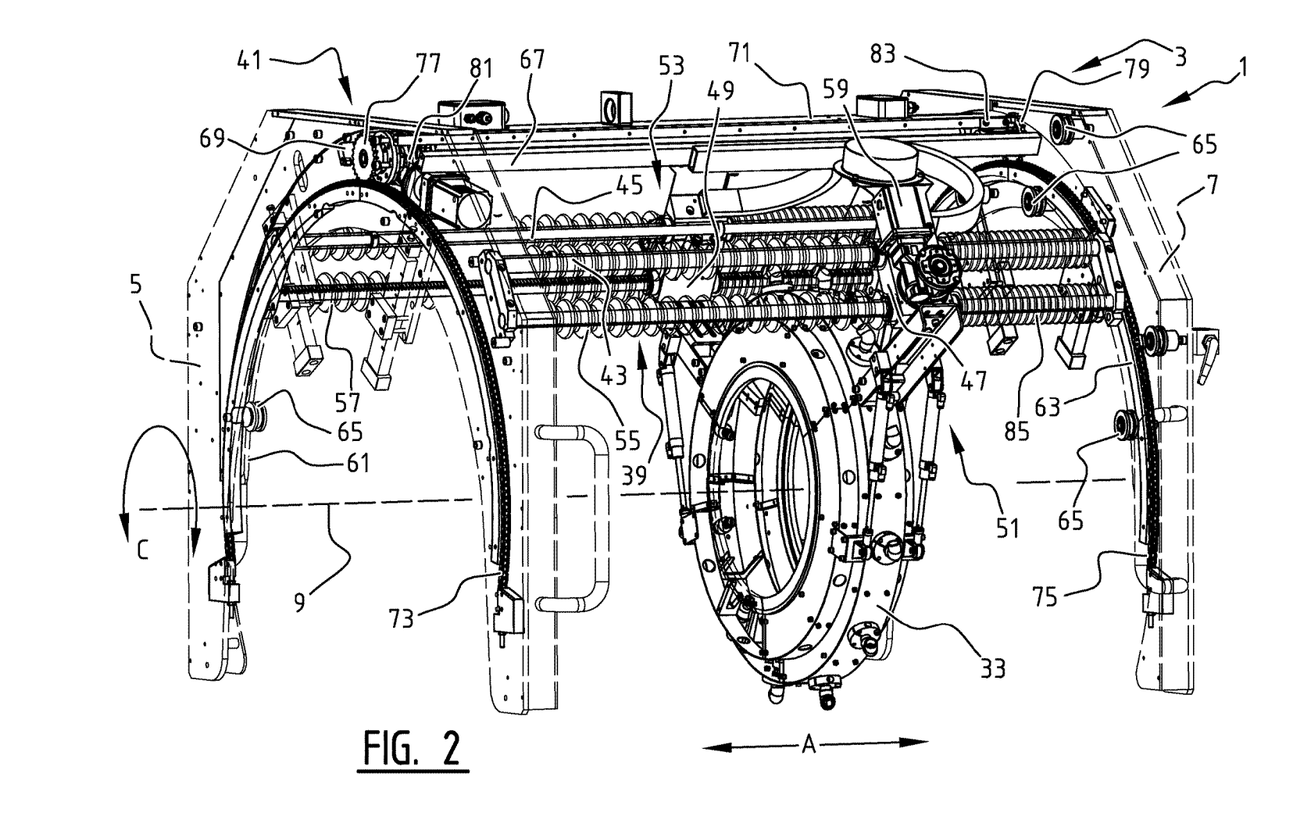
FIG. 2 shows a perspective view of the device of FIG. 1 in more detail.

FIG. 2 shows the device 1 of FIG. 1 with parts taken away to be able to show the linear motion mechanism 39 and the rotary motion mechanism 41 in more detail. The linear motion mechanism 39 is shown having two guiding rods 43 and 45 arranged on either side of the spray nozzle support element 33 and extending parallel to the longitudinal axis 9 of the frame 3.

Displaceable mounted on each of the guiding rods 43, 45 is a respective carriage 47, 49 that supports the spray nozzle support element 33. The carriages 47, 49 are displaceable along the guiding rods 43, 45 in the direction of arrows A by means of a respective rack-and-pinion type linear actuator 51, 53. The respective racks 55, 57 of the rack-and-pinion type linear actuators 51, 53 are arranged parallel to the guiding rods 43 and 45 respectively on either side of the spray nozzle support element 33.

On each carriage 47, 49 a pinion is arranged that is driven by a respective motor 59. Each of the motors 59 of the respective rack-and-pinion type actuators 51, 53 is connected to a controller that is adapted for controlling the translation of the carriages 47 and 49 and the nozzle support element 43 supported by the carriages along the longitudinal axis 9 of the frame 3 in the direction of arrows A.

As shown in FIG. 2 the racks 45, 47, as well as the guiding rods 43, 45, are each at one end thereof mounted on a first support frame 61 and at the other end thereof mounted on a second support frame 63. The first support frames 61 is rotatable arranged on one of the U-shaped frame element 5, while the second support frame 63 is rotatable arranged on the other U-shaped frame element 7. The support frames 61, 63 are rotatable arranged on the respective U-shaped element 5, 7 by means of a plurality of guiding wheels 65 that are mounted on the U-shaped elements 5, 7. As shown in FIG. 2 each of the U-shaped support frame elements 61, 63 are interconnected by means of a number of support frame connection beams 67, 69 and 71, to form a support frame that is rotatable with respect to the frame 3 about the longitudinal axis 9 of the frame 3. Also shown in FIG. 2 is that on each of the U-shaped frame elements 5 and 7 a chain 73, 75 is arranged that is functionally connected with a respective toothed wheel 77, 79. The toothed wheels 77 and 79 are each driven by a respective motor 81 and 83 such that by driving the toothed wheels 77 and 79 the toothed wheels displace along the chains 73 and 75 with the result that the support frame formed by the support frame elements 61 and 63 and the support frame connection beams 67, 69 and 71, as well as the linear motion mechanism 39 and spray nozzle support element 33 mounted thereon, rotate with respect to the frame 3 about the longitudinal axis 9 of the frame 3. Each of the motors 81 and 83 is connected to a controller that is configured to control the rotation of the support frame about the longitudinal axis 9 of the frame 3 relative to the frame 3. As shown in FIG. 2 protective sleeves 85 are arranged around the guiding rods 43 and 45 and racks 55 and 57 to protect the guiding rods and the racks.

Figure 3:
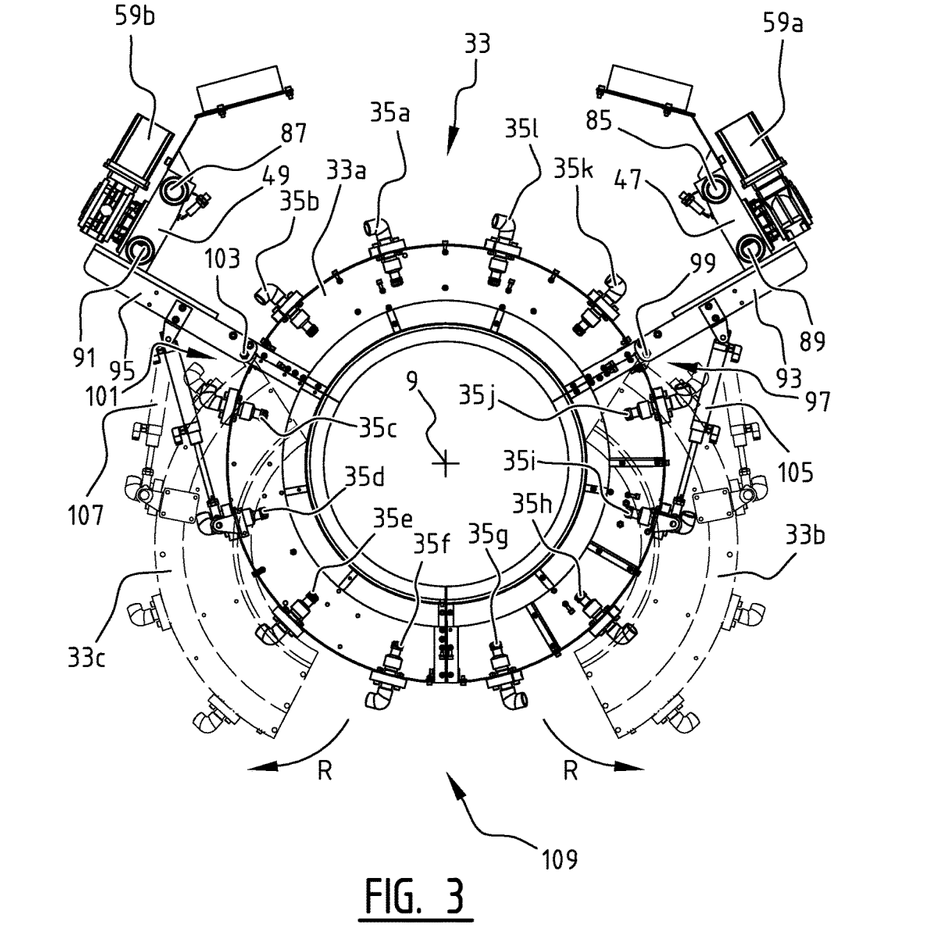
FIG. 3 shows in front view the spray nozzle support element of the device of FIGS. 1 and 2.

In FIG. 3 the spray nozzle support element 33 of the device shown in FIGS. 1 and 2 is shown, as well as the carriages 47 and 49 via which the spray nozzle support element 33 is displaceable mounted on the guiding rods 43, 45 and the racks 55 and 57 of the device as shown in FIGS. 1 and 2. As shown in FIG. 3 each of the carriages 47 and 49 is provided with a first through hole 85, 87 through which the guiding rods 43, 45 extend when the carriages 47, 49 are mounted thereon, and a second through hole 89, 91 through which the racks 55, 57 extend to be engaged by pinions that are mounted on a output shaft of the respective motors 59a and 59b.

As shown in FIG. 3 the spray nozzle support element 33 extends along a full circle about the longitudinal axis 9 of the frame. The spray nozzle support element 33 comprises three sub support elements 33a, 33b and 33c, referred to hereinafter as sub elements 33a, 33b and 33c. Each of the spray nozzle support elements 33a, 33b and 33c, extends along a part of the circle along which the spray nozzle support element 33 extends. Sub element 33a is mounted at each end thereof on a respective support bracket 93, 95. Sub element 33b is mounted at one end thereof on support bracket 93 via a hinge 97 such that sub element 33b is rotatable relative to the support bracket 93 and the sub element 33a about an axis of rotation 99 that extends parallel to the longitudinal axis 9 of the frame 3. Sub element 33c is at one end thereof mounted on support bracket 95 via a hinge 101 such that sub element 33c is rotatable relative to support bracket 95 about an axis of rotation 103 that extends parallel to the longitudinal axis 9 of the frame 3. Sub element 33b is rotatable about axis of rotation 99 by means of a piston type linear actuator 105 that is with one functional end thereof mounted on support bracket 93 and with another functional end thereof mounted to sub element 33b. Sub element 33c is rotatable about axis of rotation 103 by means of a piston type linear actuator 107 that is with one functional end thereof mounted on support bracket 95 and with another functional end thereof mounted on sub element 33c.

In FIG. 3 is schematically shown that sub elements 33b and 33c are rotatable about their respective axis of rotation 99, 103 between a closed position and an open position. In the closed position, shown in FIG. 3 by means of continuous lines, the respective free ends of the sub elements 33b and 33c are in contact such that sub elements 33a, 33b and 33c form a closed circle around the longitudinal axis 9 of the frame 3. Starting in the closed position, the sub elements 33b and 33c are rotatable about their respective axis of rotation 99, 103 by means of the linear actuators 105 and 107 in the direction of arrows R, such that the respective ends of the sub elements 33b and 33c away from the ends thereof that are mounted on the support brackets 93, 95 are moved away from each other. The sub elements 33b and 33c are thus brought in the open position thereof, shown in FIG. 3 by means of striped lines, in which position an opening 109 is present in the previously closed circle. With the sub elements 33b and 33c in the open position thereof, the spray nozzle support elements 33a, 33b, and 33c can be placed over a pipeline to be coated, after which the sub elements 33b and 33c are brought in the closed position thereof, such that the circumferential wall of the pipeline to be coated is enclosed by the spray nozzle support element 33.

Figure 4:
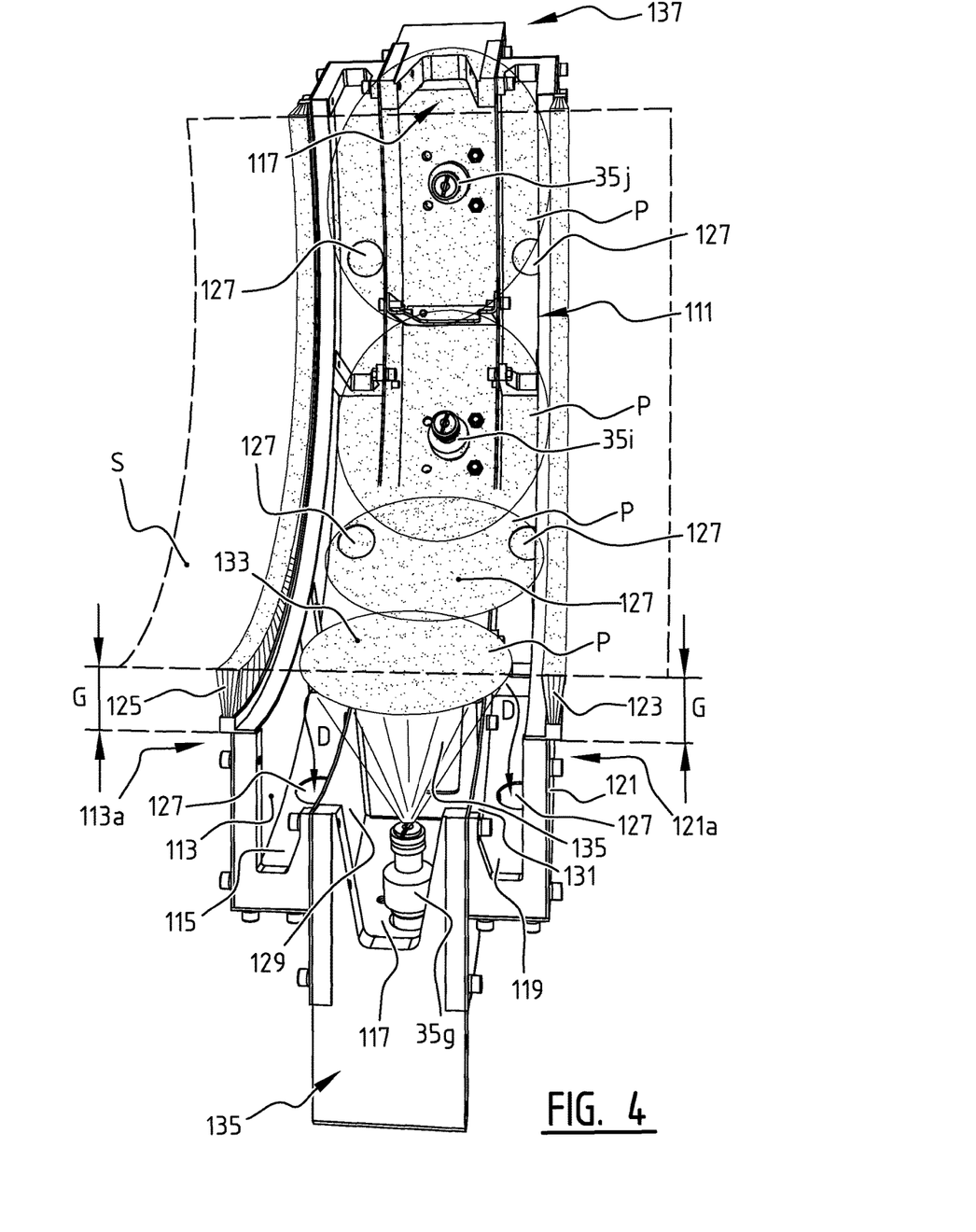
FIG. 4 shows in side view a sub element of the spray nozzle support element of FIG. 3.

As shown in FIG. 3, twelve spray nozzles 35a to 35l are evenly, i.e. equidistantly, distributed over the circle along which the spray nozzle support element 33 extends. In FIG. 4 a perspective view is shown of sub element 33b of the spray nozzle support element 33. As shown in FIG. 4 the sub element 33c comprises a spray chamber 111 that is defined by walls 113, 115, 117, 119 and 121. In top wall 117 spray nozzles 35g to 35j are arranged. The side walls 113 and 121 extend from the top walls 115 and 119 towards the longitudinal axis 9 of the frame 3 when sub element 33c is in the closed position thereof. The side walls 113 and 121 have a free end 113a and 121a, such that the spray chamber 111 is open towards the longitudinal axis 9 of the frame 3 when sub element 33c is in the closed position thereof.

As shown in FIG. 4 a brush type seal member 123, 125 is arranged on the respective free ends 113a, 121a of side walls 113, 121. In use, when a pipeline to be coated is arranged within the enclosed circle of the spray nozzle support element 33, the side walls 113, 121 extend towards the outer surface of the wall of the pipeline to be coated, which outer surface is schematically shown in FIG. 4 by means of the surface area S enclosed by striped lines. As shown in FIG. 4, the brush type seal members 123 and 125 close the gap G between the free ends 113a and 121a of the side walls 113 and 121 and the surface area S to be coated. As a result the spray chamber 111 in combination with the surface area S to be coated forms a spray space.

The spray nozzles 35g to 35j are arranged such that, with the sub element 33c in the closed position, the outlet thereof is directed towards the longitudinal axis 9 of the frame 3, such that when the sub elements 33a, 33b and 33c are arranged around the circumferential wall of a pipeline, the outlets of the spray nozzles 35g to 35j are directed towards the surface area S to be coated.

As shown in FIG. 4 suction elements in the form of suction holes 127 that are connectable to a suction apparatus (not shown) are arranged in top walls 115, 119. The suction holes 127 are partly separated from the spray nozzles 35g to 35j by means of separation walls 129 and 131 that are arranged in the spray chamber 111 between the spray nozzles and the suction holes. The suction holes 127 are arranged on opposite sides of the spray nozzles 35g and 35j. When coating material 123 is forced through the outlets of the spray nozzles a spray cone 135 of coating material results, such that coating material 133 is applied to a spray area P on said surface area S to be coated. Coating material that does not adhere to the surface area S to be coated is sucked through the suction holes 127 by means of the suction apparatus connected thereto (not shown) as shown by means of the arrows D. The separation walls 129 and 131 avoid that coating material 133 is sucked through the suction holes 127 before being brought in contact with the surface area S to be coated.

Sub elements 33a and 33c are configured the same way as sub element 3c that is shown in FIG. 4. In the closed position of the sub elements 33a, 33b and 33c, the ends 135 and 137 of the sub elements are brought into contact with the respective neighboring sub element, such that the spray chambers 111 of the respective sub elements form the spray chamber of the spray nozzle support element 33. The spray chamber of the spray nozzle support element 33 in combination with the surface area S to be coated forms an enclosed spray space.

Figure 5:
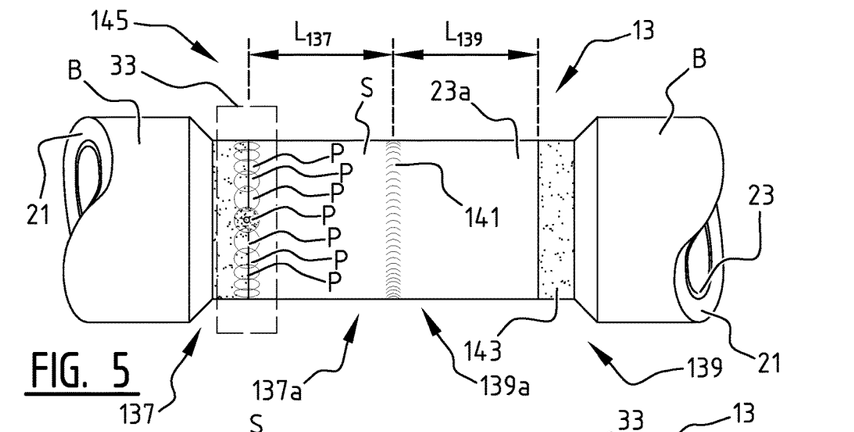
FIGS. 5 to 7 show steps of the method according to the invention performed by means of the device of FIGS. 1 to 4.
Figure 6:
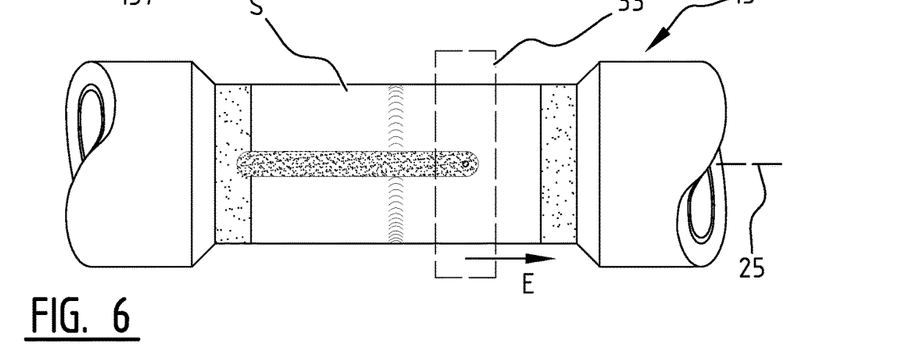
Figure 7:
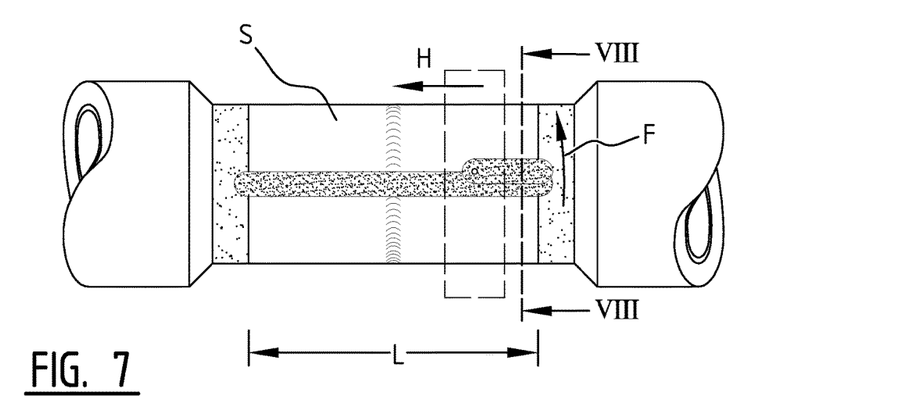

In FIGS. 5 to 7 the method according to the invention is schematically shown.

In FIGS. 5 to 7 a part of pipeline 13 as shown in FIG. 1 is shown. Pipeline 13 has a wall 23, for instance made of steel. The pipeline 13 is formed by butt-welding the end 137*a* of a first length of pipe 137 to the end 139*a* of a second length of pipe 139 by means of a circumjacent girth-weld 141. Each length of pipe 137, 139 has an insulating mantle 21 with outer surface B that surrounds the wall 23 of the respective length of pipe. The insulating mantle 21 is for instance formed by a thermo-insulating coating made of polypropylene. Between the insulating mantle 21 and the outer surface 23*a* of the wall 23 of each length of pipe 137, 139 an anticorrosion coating 143 is arranged. To be able to butt-weld the ends of the lengths of pipe by means of the circumjacent girth-weld 141, each length of pipe 137, 139 is at the respective end 137*a*, 139*a* thereof uncoated along a certain part L137, L139 of the length of pipe 137, 139, such that a so-called cut back results. After butt-welding the ends of the lengths of pipe 137, 139, the uncoated ends 137*a*, 139*a* form a gap 145 in the insulating mantle 21 and the anticorrosion coating 143 of the resulting pipeline 13.

To close the gap 145 the uncoated surface area S of the outer surface 23*a* of the wall 23 is heated, for instance in case of a steel wall by heating the wall 23 by means of induction heating. After heating the uncoated area S of the outer surface 23*a* of the wall 23 coating material in the form of powder is applied to the heated surface area S to be coated by means of the device 1 according to the invention as shown in FIGS. 1 to 4. To that effect, the frame 3 of the device 1 according to the invention is arranged stationary relative to the pipeline 13, and the spray nozzle support element 33 is arranged around the circumferential wall 23 of the pipeline 13. The result of the step is shown in FIG. 1. Subsequently, coating forming material 133 in the form of powder is forced through the spray nozzle 35 arranged on the spray nozzle support element 33. As shown in FIG. 4 and FIG. 5 this results in coating forming material 133 to be applied on the surface area S as to be coated in a spray area P for each spray nozzle 35. For clarity reasons, only one spray area P of one of the spray nozzles is shown in FIGS. 6 and 7 during the displacement of the spray nozzle support element 33 and the spray nozzles arranged thereon. While forcing the coating forming material 133 through the spray nozzles, the spray nozzle support element is displaced relative to the frame 3 such that the spray nozzles are translated in a first direction E parallel to the longitudinal axis 25 of the pipeline 13 by displacing said spray nozzle support element 33 along the guiding rods 43, 45 parallel to the longitudinal axis 9 of the frame 3 that coincides with the longitudinal axis 25 of the pipeline as is shown in FIG. 6. When the end of the surface area S to be coated is reached, the spray nozzle support element 33 is displaced relative to the frame 3 such that the spray nozzles are rotated about said central longitudinal axis 25 of said pipeline 13 in the direction F and the spray nozzle support element 33 is translated in the direction H opposite to the first direction E along the length L of said surface area S to be coated, such that the coating material applied on the surface area S while displacing the spray nozzle support element in the direction of arrow H partly overlaps the coating material that was applied while displacing the spray nozzle support element 33 in the direction of arrow E during the previous step. In FIG. 7 the spray nozzles are rotated about said central longitudinal axis 25 of said pipeline 13 in the direction F over half the distance between adjacent spray nozzles along the circle about said longitudinal axis of the pipeline along which circle the spray nozzle support element extends.

The coating material in the form of powder applied to the heated surface area S to be coated is heated by heat transferred from the wall 23 to said coating material such that an anti-corrosion coating applied to the surface area S results. This process of applying and heating powder as a coating material to form a coating is a so-called powder coating process.

As shown in FIGS. 5 to 7 the translation of the spray nozzle support element 33 starts at a start position and ends at an end position such that the coating material applied to the surface area S to be coated partly overlaps the anti-corrosion coating 143 that was already arranged on the wall 23 of the lengths of pipe 137, 139, such that a continuous anticorrosion coating results. This can be easily achieved because of the single row configuration of the spray nozzles.

Figure 8A:
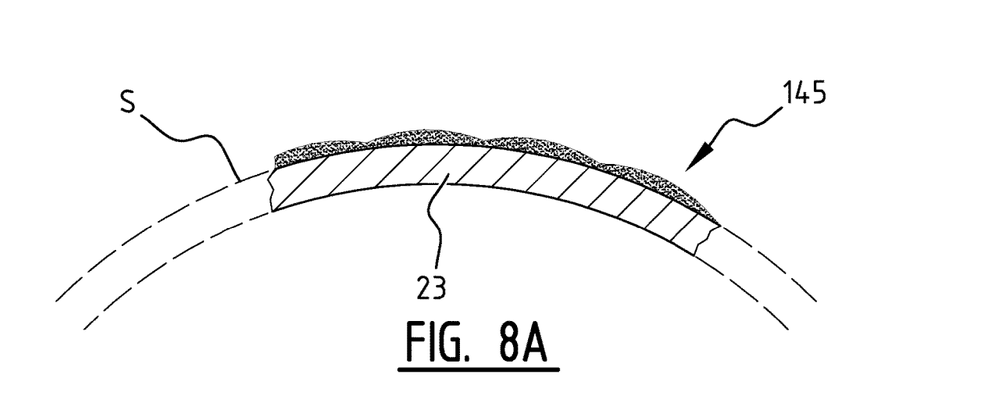
FIGS. 8a and 8b show part of the wall of the pipeline shown in FIGS. 5 to 7 in cross section after subsequent steps of the method shown in FIGS. 5 to 7.

As shown in FIGS. 4 and 5 the spray areas P of neighboring spray nozzles 35 overlap. The result of the application of coating material to the surface area S after the step of translating the spray nozzle support element 33 in the direction of arrow E and before the step of translating the spray nozzle support element in the direction of arrow H is shown in FIG. 8*a*. As shown in FIG. 8*a* the thickness of the applied layer of coating material 145 varies along the circumference of the wall 23.

Figure 8B:
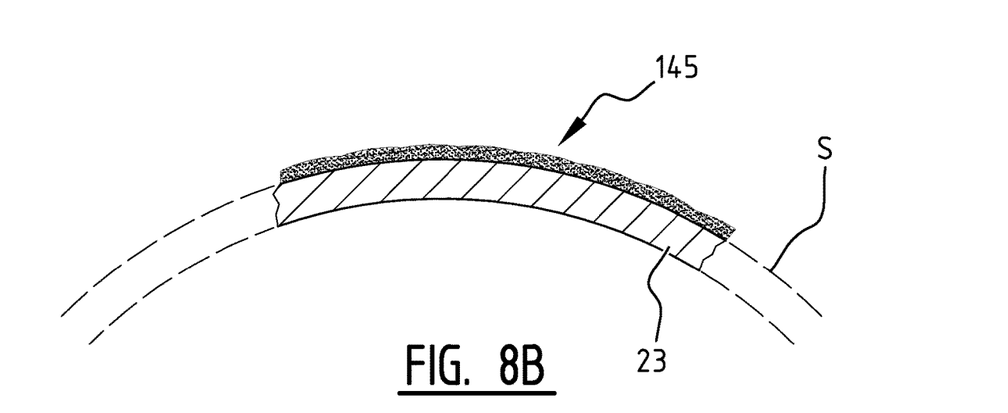

The result of the application of coating material to the surface area S after the step of translating the spray nozzle support element 33 in the direction of arrow H is shown in FIG. 8*a*. As shown in FIG. 8*b* the variation of the thickness of the applied layer of coating material 145 along the circumference of the wall 23 is less than the result before the step of translating the spray nozzle support element 33 in the direction of arrow H as shown in FIG. 8*a*.

As a result of the distribution of the spray nozzles over a full circle as shown in FIGS. 1 to 3, the whole surface area S to be coated can be more uniformly coated by translating the spray nozzle support element one time in the direction of arrow E and one time in the direction of arrow H.

Alternatively, instead of first translating the spray nozzle support element 33 in the first direction E along the length L of said surface area S to be coated, then rotating the spray nozzle support element 33, and subsequently translating the spray nozzle support element 33 in direction H opposite to the first direction E along the length L of said surface area S to be coated as described with reference to FIGS. 5 to 7, the spray nozzle support element 33 is rotated back and forth about the longitudinal axis 25 of the pipeline 13 in an oscillating motion while translating the spray nozzle support element 33 in the first direction E along the length L of said surface area S to be coated. In that case the same result of a more uniformly coated surface area S can be achieved while translating the spray nozzle support element 33 only in one direction, i.e. the first direction E.

The description and drawings merely illustrate the principles of the invention. It will thus be appreciated that those skilled in the art will be able to devise various arrangements that, although not explicitly described or shown herein, embody the principles of the invention and are included within its spirit and scope.

Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A device for coating a surface area of a gap in the coating of a pipeline, said surface area having a length along the central longitudinal axis of the pipeline and a width of at least part of the circumference of the pipeline, said device comprising:
a frame;
a spray nozzle support element supporting a plurality of spray nozzles, wherein the spray nozzle support element extends along a full circle about said longitudinal axis of the frame and the plurality of spray nozzles are distributed along said full circle;
a linear motion mechanism configured for translating the spray nozzle support element relative to the frame and parallel to a longitudinal axis of the frame; and
support members configured for arranging the frame stationary relative to the pipeline with said longitudinal axis of said frame coinciding with the central longitudinal axis of the pipeline;
such that by translating the spray nozzle support element relative to the frame by means of said linear motion mechanism, the spray nozzles are displaceable along the length of said surface area with said spray nozzles directed at said surface area;
wherein the device further comprises a rotary motion system coupled to spray nozzle support element, wherein the rotary motion system is configured to rotate the spray nozzle support element relative to the frame around said longitudinal axis of the frame;
such that by rotating the spray nozzle support element relative to the frame about said longitudinal axis of the frame the spray nozzles are displaceable along the width of said surface area; and
wherein the spray nozzles are cone spray nozzles and are arranged such that in use adjacent spray cones partly overlap.

2. The device according to claim 1 wherein the linear motion mechanism and the rotary motion system are arranged in series and have separate drives.

3. The device according to claim 1, wherein the plurality of spray nozzles are equidistantly distributed along said full circle.

4. The device according to claim 1, wherein:
said spray nozzle support element comprises a plurality of sub support elements each extending along a part of said full circle about said longitudinal axis of the frame, which sub support elements are interconnected via hinges such that said sub support elements are rotatable relative to each other to be able to arrange said spray nozzle support element around the circumference of said pipeline; and
wherein the device further comprises a number of actuators for rotating said sub support elements relative to each other.

5. The device according to claim 1, wherein
the spray nozzle support element comprises a spray chamber defined by a number of walls, which chamber is open towards said longitudinal axis of the frame and in which spray chamber said spray nozzles are arranged; and
wherein said spray chamber is configured to extend from said spray nozzles towards said longitudinal axis of the frame such that together with the surface area to be coated said spray chamber encloses a spray space.

6. The device according to claim 5, wherein the spray nozzle support element further comprises a seal member arranged at an end of the spray chamber away from the spray nozzles and configured to close a gap between the spray chamber and the surface area to be coated.

7. The device according to claim 5, further comprising a number of suction elements arranged in said spray chamber and connected to a suction apparatus.

8. The device according to claim 7 wherein said spray nozzle support element comprises a number of separation walls arranged in the spray chamber between the suction elements and the spray nozzles, and configured for partly separating said suction elements from said spray nozzles.

9. The device according to claim 7, wherein said suction elements are arranged on opposite sides of said spray nozzles.

10. The device according to claim 1, wherein each of the spray nozzles comprises an adjustment mechanism configured for adjusting the output rate of a coating material sprayed by each of said spray nozzles.

11. The device according to claim 1, wherein said support members include adjusting members configured for adjusting the position of said longitudinal axis of said frame relative to the central longitudinal axis of said pipeline.

12. The device according to claim 1, wherein said support members are arranged to support said frame on a coated surface area of said pipeline.

13. The device according to claim 1, wherein said support members include clamping members configured for clamping the frame on the pipeline such that the frame is stationary relative to the pipeline.

14. The device according to claim 1, wherein the frame comprises two parallel U-shaped frame elements extending perpendicular to said longitudinal axis of the frame and spaced apart along said longitudinal axis of the frame, wherein said support members are arranged on said U-shaped frame elements, and wherein said linear motion mechanism is arranged such that said spray nozzle support element is translatable in between said U-shaped frame elements.

* * * * *